United States Patent Office 3,297,706
Patented Jan. 10, 1967

3,297,706
METHOD OF PRODUCING SUBSTANTIALLY COLORLESS AND ODORLESS 5(α-HYDROXY-α - 2 - PYRIDYLBENZYL) - 7 - (α-2-PYRIDYLBENZYLIDENE) - 5 - NORBORNYLENE-2,3-DISCARBOXIMIDE
Thomas R. Hopkins, Overland Park, Paul D. Strickler, Shawnee Mission, and Lee V. Phillips, Overland Park, Kans., assignors to Gulf Oil Corporation, Pittsburgh, Pa., a corporation of Pennsylvania
No Drawing. Filed July 6, 1964, Ser. No. 380,669
2 Claims. (Cl. 260—295)

This invention relates to an improved procedure for manufacture of a substituted 5-norbornene-2,3-dicarboximide which possesses utility as a pesticide. More specifically, a procedure has been devised for manufacturing substantially pure 5-(α-hydroxy-α-2-pyridylbenzyl)-7-(α-2-pyridylbenzylidene)-5-norbornylene-2,3-dicarboximide, in improved yields and under conditions which are commercially feasible.

In Science, vol. 144, pages 412–413, of April 24, 1964, there is disclosed the synthesis of the aforementioned compound by means of the following steps:

(a) Reaction of two moles of 2-benzoylpyridine with cyclopentadiene in the presence of an essentially anhydrous solution of sodium ethoxide in ethanol to yield a mixture containing a fulvene addition product.

(b) Reaction of the product of step (a) with maleimide by heating in benzene solution to yield a product mixture containing two endo and two exo stereoisomers.

(c) Filtration of the product mixture of (b) to yield a solid product melting at 190° to 198° C.

The use of sodium ethoxide as the condensing agent in the first step of the synthesis on a commercial scale normally yields a reaction product which is dark brown in color and obviously impure, resulting in carrying over of impurities into the succeeding step. We have discovered that sodium hydroxide may be used instead of sodium ethoxide to produce a benzoyl-pyridine-cyclopentadiene addition product of good purity and light orange color. By use of the improved product of step (a) in the reaction with maleimide in step (b), and by use of a novel purification procedure we have obtained a substantially colorless and odorless product containing no detectable traces of the reaction solvent.

Briefly, our improved procedure comprises the following steps:

(a) Reacting 2-benzoylpyridine with cyclopentadiene under an inert atmosphere in the presence of a solution of sodium or potassium hydroxide in a lower alkanol to yield a product of reaction of two mols of 2-benzoylpyridine per mol of cyclopentadiene, consisting essentially of 2 - (α - hydroxy - α-2-pyridylbenzyl)-6-phenyl-6-(2-pyridyl) fulvene;

(b) Reacting maleimide with the reaction product of step (a) in an inert liquid reaction medium under an inert atmosphere to yield a solid product consisting essentially of isomeric forms of 5-(α-hydroxy-α-2-pyridylbenzyl) - 7 - (α-2-pyridlbenzylidene)-5-norborene-2,3-dicarboximide; and (c) Dissolving the solid product of step (b) in dilute aqueous acid, removing insoluble impurities and solvent, and neutralizing the resulting solution with a base, preferably ammonia, to yield a solid, solvent-free and ash-free product.

Each step of the process is described in more detail in the discussion which follows. Parts given in the procedures are parts by weight unless specified otherwise.

(a) *Reacting 2-benzoylpyridine with cyclopentadiene*

Completely anhydrous conditions are neither necessary nor easily obtainable in this step, since water is a reaction product. It has been found feasible to use sodium or potassium hydroxide dissolved in a lower alkanol, preferably ethanol, to promote the reaction. Preferably the molar ratio of 2-benzoylpyridine to cyclopentadiene is at least 1.5 and less than 2.0, rather than 2.0 or above, because some loss of cyclopentadiene through competing side reactions normally occurs. It is desirable that all of the 2-benzoylpyridine charged to the reactor be consumed by the intended reaction. This can be assured by use of an excess of cyclopentadiene. However, a large excess of cyclopentadiene is detrimental. A typical procedure is presented below.

Into a stirred reactor equipped with a vapor outlet, reflux condenser and a heat exchange means are charged 852 parts by weight of ethanol and 11.4 parts of sodium hydroxide pellets. The pellets are dissolved, with stirring, following which the temperature is lowered to 5° C. and the reactor is purged with nitrogen gas, a steady flow of nitrogen through the reactor being maintained during the remainder of the procedure.

With the aid of a steam heating coil, 300 parts by weight of 2-benzoylpyridine is melted and added slowly to the reactor, with stirring, after which the temperature is lowered to about 5° C. by passing refrigerant through a cooling jacket. The flow of refrigerant is maintained to control the temperature within the range of about 15° to 25° C. during the addition of about 62 to 66 parts by weight of cyclopentadiene (preferably freshly prepared by decomposition of the dimer). After the exothermic reaction has subsided, cooling is discontinued and the reaction mixture is then maintained at 15° to 25° C., with stirring, for about 15 hours, then is cooled to 0° to 5° C. The solid product is separated by filtration. The filter cake is then slurried in about 680 parts of ethyl acetate, heated to 65 to 70° C., with stirring, then cooled to 5° to 10° C. and the solid product is again recovered by filtration. The product is light orange in color and consists essentially of 2-(α-hydroxy-α-2-pyridylbenzyl)-6-phenyl-6-(2-pyridyl) fulvene, which is the product of reaction of two mols of 2-benzoyl-pyridine with each mol of cyclopentadiene.

(b) *Reacting maleimide with the product of step (a)*

In this step the reagents are at most, only partially soluble in the inert reaction solvent. The substituted fulvene reaction product of step (a) is suspended in the solvent and the final product remains suspended and apparently insoluble after formation. However, the change in size of crystals and crystalline aggregates in a slurry of the final product over an extended period of time may be an indication of the occurrence of limited solubility. In the selection of an inert solvent, xylene is preferable to benzene, particularly from the standpoint of hazards created by escape of solvent vapor into the atmosphere during purification of the product and recovery of solvent for re-use.

As often occurs in heterogenous reactions in an inert solvent, some solvent becomes entrapped in or adsorbed on the final product, so that it is difficult or impossible to remove. Extracting with a more volatile wash solvent after recovery of the solid product by filtration will alleviate this problem, in part.

Following is an illustrative procedure which may be used in this step.

Nitrogen gas is admitted to a stirred reactor vessel and continued throughout the following procedure:

Approximately 1090 parts by weight of xylene is charged to the reactor, stirring is begun, and then 70.5 parts of maleimide is added. To the resulting mixture is then added 274 parts of the product obtained in step (a).

The reactor is heated to 80° C. and reaction is continued at this temperature for approximately 12 hours. Heating is then discontinued and the temperature is allowed to fall to 30° to 35° C. while stirring is continued. By use of refrigeration, the reaction mixture is then cooled to 0° to 5° C. and the suspended solid reaction product is separated by filtration. The solid is washed on the filter with about 50 parts of hexane. The filter cake is then slurried in 1000 parts of hexane in a stirred vessel, and is agitated at about 65° to 70° C. for three hours, after which the mixture is cooled to below 20° C. and the solid product is again separated by filtration. The hexane solvent is then removed from the filter cake by treating in a vacuum dryer at 60° C. for 12 hours. The dry solid product consists essentially of isomeric forms of 5-(α-hydroxy-α-2-pyridylbenzyl)-7-(α-2-pyridylbenzylidene)-5-norbornene-2,3-dicarboximide. A trace of odor indicates the presence of a small amount of impurity, principally xylene. The complete elimination of reaction solvent from the solid product is extremely difficult.

The solid reaction product is, in fact, a very complex and unusual mixture of substances. The name given above corresponds to the structural formula below:

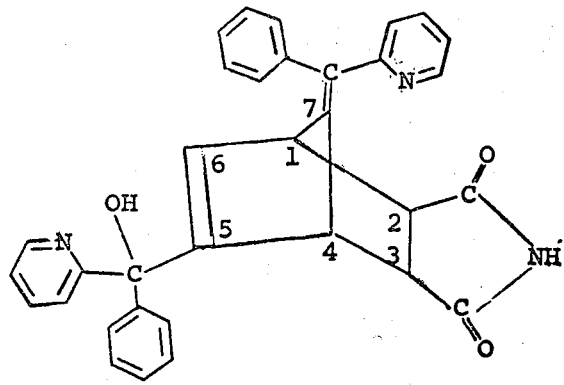

The structural formula may also be written as follows:

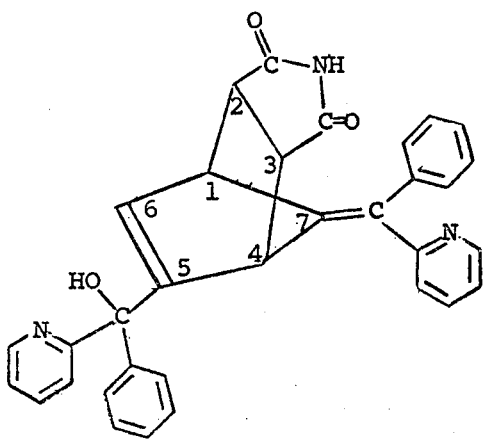

It can readily be seen that these structural formulas represent two stereoisomeric substances, not a single compound. Furthermore the substituent group attached to position 7 is not free to rotate and may occupy either of two positions. Obviously, then, each of the above structural formulas represents two possible stereoisomers, which brings the total to four.

Besides the four stereoisomers, it will be noticed that the substituent group attached at the 5-position has an asymmetric carbon atom, so that each stereoisomer may also exist as dextro and laevo optical isomers. If we also consider variations possible in relative positions of the bonds at the 1 and 4 positions, it is reasonable to expect to find sixteen or more isomeric substances in the product. If one also considers the very reasonable probability of the existence of polymorphic forms of some of the isomeric substances in the mixture, the complexity of the product is almost beyond description. In such a complex mixture, sharp melting points are not to be expected. The product has a melting range of several degrees, which may vary somewhat from batch to batch, and cannot be used as a definite indication of the degree of purity.

(c) *Purification of the product of step* (b)

Because of the specific utility of the product, the presence of impurities, particularly those of pronounced odor or taste, is undesirable. If possible, the product should possess no odor or taste which would serve to warn rats of its presence in poisoned bait formulations.

It is also desirable to obtain the product in sufficiently finely divided form that it will pass through a 30 mesh sieve or finer (U.S. Standard Series) so as to facilitate uniform mixing with other ingredients of poisoned bait formulations. A product which is sufficiently pure for test purposes, though probably not for continued use over a period of years, may be obtained by means of the simple procedure described below:

The solid product of step (b) is slurried in water in a closed vessel equipped with steam inlet, distillation column with condenser and a centrifugal circulating pump. Steam distillation is carried on for about 20 minutes. The contents of the steam distillation vessel are cooled to ambient temperature and the resulting slurry is circulated through the centrifugal pump for a length of time sufficient to reduce the size of crystalline aggregates to less than 30 mesh screen size. The purified solid product is then recovered by filtration, followed by drying in a vacuum dryer at 75° to 100° C. and 1 mm. pressure for 5 hours. The product is a powder of creamy to tan color, which melts at about 173° to 180° C. Test results on a small number of rats indicate that this product, although it has a definite odor, possesses no odor or taste which appears to be objectionable to either wild species or white laboratory rats.

The above procedure may be regarded as a reasonably satisfactory purification method at present. However, careful analyses indicate that both this product and that made by the procedure reported in Science, vol. 144, as mentioned above, contain substantial amounts of reaction solvent and other impurities. It can be predicted with some confidence that eventually individual rats with highly developed senses of taste and smell will reject baits containing this product. Judging from past experience with pesticides, this will result inevitably in the development of a strain of rats which are more difficult to poison with this substance. By reducing the probability of this occurrence in the early history of the use of the product, the useful life of this raticide can be greatly prolonged. Purification of the composition, however, is rendered difficult by the presence of the imide structure which is easily decomposed. We have now discovered a simple procedure by means of which the product of step (b) can be converted into a material which is completely free of reaction solvent. Although some of the physical properties are slightly different (melting range is slower), the resulting product appears to be equally or slightly more toxic to rats and is much less likely to be detected in poisoned baits. The following is an illustrative purification procedure:

A solution of 40 ml. of concentrated hydrochloric acid in 100 ml. of water is added during the course of 10 min. to a stirred slurry of 100 g. of solid product of step (b) in 600 ml. of water at 20° C. The mixture is stirred at room temperature for an additional 15 min., then the murky solution is filtered to remove approximately 0.6 g. of insoluble residue. The filtrate is extracted with two 75 ml. portions of hexane to remove traces of solvent. Alternatively, solvent removal and clarification may be accomplished simultaneously by use of a solid adsorbent. A solution of 35 ml. of 28% ammonia in 300 ml. of water is added slowly with good stirring to the aqueous phase during a 1 hr. period. After addition has been completed, the resulting slurry is stirred at room temperature for 15 min., then the solid product is removed by filtration. The product is reslurried in 750 ml. of water and filtered. After the light cream colored product has been dried at 75° C. at 2 mm. pressure for 4 hrs., it weighs 93.4 g. and melts at 140° to 155° C. The dry product is nearly white, bearing a close resemblance to white, unbleached wheat flour.

The addition of ammonia over a 1 hr. period as described above yields a crystalline product which can be filtered easily and the final product contains only about 0.3% to 0.4% chloride ion. However, precipitation carried out with rapid addition of ammonia yields a "mud-like" precipitate which is extremely difficult to filter, wash and dry. Consequently, product made in this way may contain as much as 2% to 3% of chloride ion. If desired, the chloride content may be reduced by repeated washing with water.

Many acids can be employed to form aqueous solutions of salts of the product of step (b), but strong mineral acids such as sulfuric, phosphoric and hydrochloric are preferable. Likewise, any base stronger than the product of step (b) which will form a water-soluble salt can be employed for neutralization of the acidic solution, but ammonia, sodium hydroxide, potassium hydroxide, and the alkaline carbonates and bicarbonates appear to be the more practical. Of these ammonia is particularly desirable because any excess base which is trapped during formation of the precipitate can be removed during the drying step and will leave no inorganic ash upon combustion analysis.

Various modifications of the illustrative procedures disclosed herein may be made without departing from the spirit and scope of the invention, and will occur to those who are skilled in the art.

What is claimed is:

1. In a process for manufacturing substantially pure colorless and odorless 5-($\alpha$-hydroxy-$\alpha$-2-pyridylbenzyl)-7-($\alpha$-2-pyridylbenzylidene)-5-norbornylene-2,3 - dicarboximide comprising the steps:
    (a) reacting 2-benzoylpyridine with cyclopentadiene under an inert atmosphere in the presence of a solution of an alkali metal hydroxide selected from the group consisting of sodium hydroxide and potassium hydroxide in a lower alkanol to yield a product of reaction of two mols of 2-benzoylpyridine per mol of cyclopentadiene consisting essentially of 2-($\alpha$-hydroxy-$\alpha$-2-pyridylbenzyl)-6-phenyl-6 - (2 - pyridyl) fulvene, and
    (b) reacting maleimide with the product of step (a) in an inert liquid reaction medium under an inert atmosphere to yield a solid product consisting essentially of isomeric forms of 5-($\alpha$-hydroxy-$\alpha$-2-pyridylbenzyl)-7-($\alpha$-2-pyridylbenzylidene) - 5 - norbornene-2,3-dicarboximide, the improvement consisting of
    (c) purifying the solid product of step (b) by dissolving said product in dilute aqueous acid, removing insoluble impurities and inert liquid reaction medium from the resulting solution and precipitating the solid product by neutralizing the solution with a basic substance which is a stronger base than the product and which forms a water-soluble neutralization product.

2. In a process for manufacturing substantially pure colorless and odorless 5-($\alpha$-hydroxy-$\alpha$-2-pyridylbenzyl)-7-($\alpha$-2-pyridylbenzylidene)-5-norbornylene - 2,3 - dicarboximide comprising the steps
    (a) reacting 2-benzoylpyridine with cyclopentadiene in a molar ratio of between 1.5 and 2.0 mols of 2-benzoylpyridine per mol of cyclopentadiene under an inert atmosphere in the presence of a solution of sodium hydroxide in ethanol to yield a product of reaction of two mols of 2-benzoylpyridine per mol of cyclopentadiene consisting essentially of 2-($\alpha$-hydroxy-$\alpha$-2-pyridylbenzyl)-6-phenyl-6 - (2 - pyridyl) fulvene, and
    (b) reacting maleimide with the product of step (a) in an inert liquid reaction medium under an inert atmosphere to yield a solid product consisting essentially of isomeric forms of 5-($\alpha$-hydroxy - $\alpha$ - 2-pyridylbenzylidene)-5 - norbornene - 2,3 - dicarboximide, the improvement consisting of
    (c) purifying the product of step (b) by dissolving said product in an aqueous solution of a strong mineral acid, removing insoluble impurities and inert liquid reaction medium from the resulting solution of product in aqueous acid, and precipitating purified solid product by neutralizing said solution with ammonia.

References Cited by the Examiner

Fieser and Fieser: Advanced Organic Chemistry, Reinhold (1961), page 285.

Poos et al.: Journal of Medicinal and Pharmaceutical Chemistry, vol. 5 (1962), pages 883–96.

Roszkowski et al.: Science, vol. 144, No. 3617 (1964), pages 412 and 413.

Vogel: Practical Organic Chemistry, Wiley (1957), 3rd ed., page 627.

WALTER A. MODANCE, *Primary Examiner.*

JOHN D. RANDOLPH, *Examiner.*

ALAN L. ROTMAN, *Assistant Examiner.*